US006712923B2

(12) United States Patent
Tanaka

(10) Patent No.: US 6,712,923 B2
(45) Date of Patent: Mar. 30, 2004

(54) MANUFACTURING APPARATUS AND MANUFACTURING METHOD OF SOLID POLYMER FILM WITH CATALYST DEPOSITED THEREON

(75) Inventor: Katsuhisa Tanaka, Toyota (JP)

(73) Assignee: Toyota Jidosha Kabushiki Kaisha (JP)

( * ) Notice: Subject to any disclaimer, the term of this patent is extended or adjusted under 35 U.S.C. 154(b) by 0 days.

(21) Appl. No.: 09/758,241

(22) Filed: Jan. 12, 2001

(65) Prior Publication Data

US 2001/0008166 A1 Jul. 19, 2001

(30) Foreign Application Priority Data

Jan. 12, 2000 (JP) ....................................... 2000-003534

(51) Int. Cl.[7] .......................... B32B 31/20; B05D 5/12; B41M 3/12; C25D 17/10; H01H 4/88

(52) U.S. Cl. ...................... 156/230; 156/238; 156/247; 156/289; 156/540; 156/272.2; 156/543; 427/148; 427/58; 427/209; 204/280; 429/24; 429/208; 429/212

(58) Field of Search ................................ 156/230, 231, 156/235, 238, 237, 241, 202, 247, 232.2, 289, 540, 543, 520, 500, 582, 583, 380.7, 494, 344, 584; 427/146, 147, 148, 471, 58, 208, 210, 211, 366, 374.1; 204/280, 283, 294, 296; 429/22, 206, 212

(56) References Cited

U.S. PATENT DOCUMENTS 2,485,725 A * 10/1949 Francis, Jr. ................. 442/183
2,556,078 A * 6/1951 Francis, Jr. ................. 156/238
2,559,649 A * 7/1951 Little et al. ................. 156/231
3,888,745 A * 6/1975 Hojyo ...................... 204/18 R
4,086,112 A * 4/1978 Porter ....................... 156/73.1
4,288,275 A * 9/1981 Davis ......................... 156/367
4,340,438 A * 7/1982 Davis ......................... 156/234
4,378,264 A * 3/1983 Pilette et al. ............... 156/238
4,475,975 A * 10/1984 Talley et al. ................ 156/234
4,724,026 A * 2/1988 Nelson ....................... 156/233

FOREIGN PATENT DOCUMENTS

JP 10-064574 * 3/1998 ............ H01M/8/10
JP (P) HEI 10-64574 6/1998

OTHER PUBLICATIONS

Temin, S.C., "Pressure–Sensitive Adhesives for Tapes and Labels.", from Handbook of Adhesives, .3rd. Ed. edited by Irving Skeist, Chapman & Hall, 1990, p 657.*

* cited by examiner

*Primary Examiner*—J. A. Lorengo
(74) *Attorney, Agent, or Firm*—Kenyon & Kenyon

(57) ABSTRACT

An apparatus and method for manufacturing a solid polymer film with a catalyst sufficiently deposited thereon preheats a solid polymer film and then hot presses this solid polymer film together with a catalyst carrier film. Hot pressing the solid polymer film while it is soft from preheating increases the bond strength between the solid polymer film and the catalyst such that separation of the catalyst from the solid polymer film during film separation can be prevented. Moreover, keeping the catalyst carrier film cool prior to hot pressing and making the temperature on the catalyst carrier film side slightly lower that than on the solid polymer film side during hot pressing inhibits an increase in binding strength between the film and the catalyst, and thereby improves separation of the film.

8 Claims, 4 Drawing Sheets

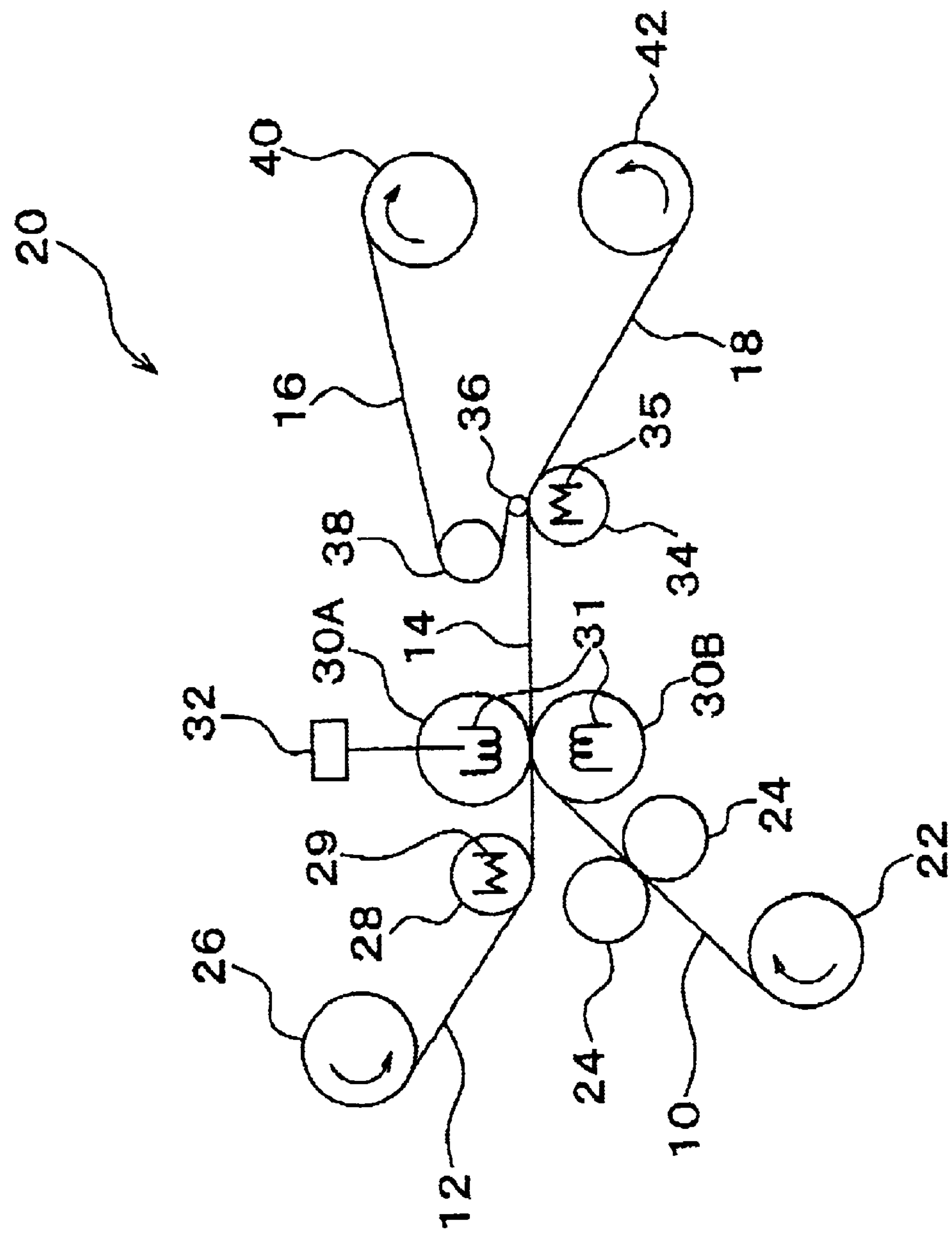
F I G. 1
20
40
42
16
18
36
35
38
34
30A
14
31
32
30B
29
28
24
24
22
26
12
10

200
40A
40B
42
16A
180
16B
36A
36B
38A
38B
30A
140
31
30B
28A
28B
12A
12B
26A
25
25
26B
24
24
10
22

MANUFACTURING APPARATUS AND MANUFACTURING METHOD OF SOLID POLYMER FILM WITH CATALYST DEPOSITED THEREON

INCORPORATION BY REFERENCE

The disclosure of Japanese Patent Application No. 2000-003534 on Jan. 12, 2000 including the specification, drawings and abstract is incorporated herein by reference in its entirety.

BACKGROUND OF THE INVENTION

1. Field of the Invention

The invention relates to an apparatus and method for manufacturing a solid polymer film with a catalyst deposited thereon.

2. Description of Related Art

An apparatus for manufacturing a solid polymer film with a catalyst deposited thereon which joins solid polymer film and catalyst carrier film by means of a hot press and then separates the film therefrom has been proposed (e.g. Japanese Patent Application Laid-Open Publication No. Hei 10-6457). This apparatus joins a solid polymer film with catalyst carrier films by directly hot pressing them while the solid polymer film is sandwiched between the catalyst carrier films, and then separates each film of the catalyst carrier films from the thus obtained solid polymer film with a catalyst deposited thereon at an angle of substantially 90 degrees with respect thereto. Note that the solid polymer film with a catalyst deposited thereon manufactured in this way is used as an electrolyte (solid polymer film) and catalyst electrode (catalyst layer) used in a solid polymer fuel cell.

However, with the aforementioned apparatus there are cases in which the catalyst may not transfer well to the solid polymer film. The solid polymer film and the catalyst are joined by hot pressing, but the binding strength therebetween is weak. As a result the catalyst may separate from the solid polymer film in some areas when the film is separated from the solid polymer film.

SUMMARY OF THE INVENTION

An object of the invention is to manufacture a solid polymer film with a catalyst sufficiently deposited thereon by sufficiently transferring a catalyst to a polymer film.

In order to achieve the foregoing objective, a first aspect of an apparatus of the invention for manufacturing a solid polymer film with a catalyst deposited thereon is provided with a heater for preheating the solid polymer film, a hot press machine for forming a joined member by heating and pressing together at least one catalyst carrier substrate carrying a catalyst on one side of a transfer substrate and a preheated solid polymer film, and a separating machine for separating the transferred substrate from the joined member.

Preheating the solid polymer film leads to an increase in bond strength between the solid polymer film and the catalyst, as well as prevents the catalyst from separating from the solid polymer film during the separation process of the transfer substrate.

In addition to the foregoing aspect, the catalyst carrier substrate may also be cooled prior to being contacted with the solid polymer film. This enables even better transfer of the catalyst to the solid polymer film.

Also in the foregoing aspect, a cooling machine for cooling the joined member may be provided. This makes it possible to further inhibit separation of the catalyst from the solid polymer film during the transfer substrate separation process.

Further, in the foregoing aspect, the heater and the hot press machine may be formed integrated. This enables the number of construction parts of the apparatus to be reduced, as well as simplifies the construction.

The apparatus and method according to the foregoing aspect enable the manufacture of a solid polymer film with a catalyst sufficiently deposited thereon with little catalyst separation.

BRIEF DESCRIPTION OF THE DRAWINGS

FIG. 1 is a schematic drawing of a construction of an apparatus for manufacturing a solid polymer film with a catalyst deposited thereon of a first embodiment of the invention;

DETAILED DESCRIPTION OF THE PREFERRED EMBODIMENTS

Figure 2:
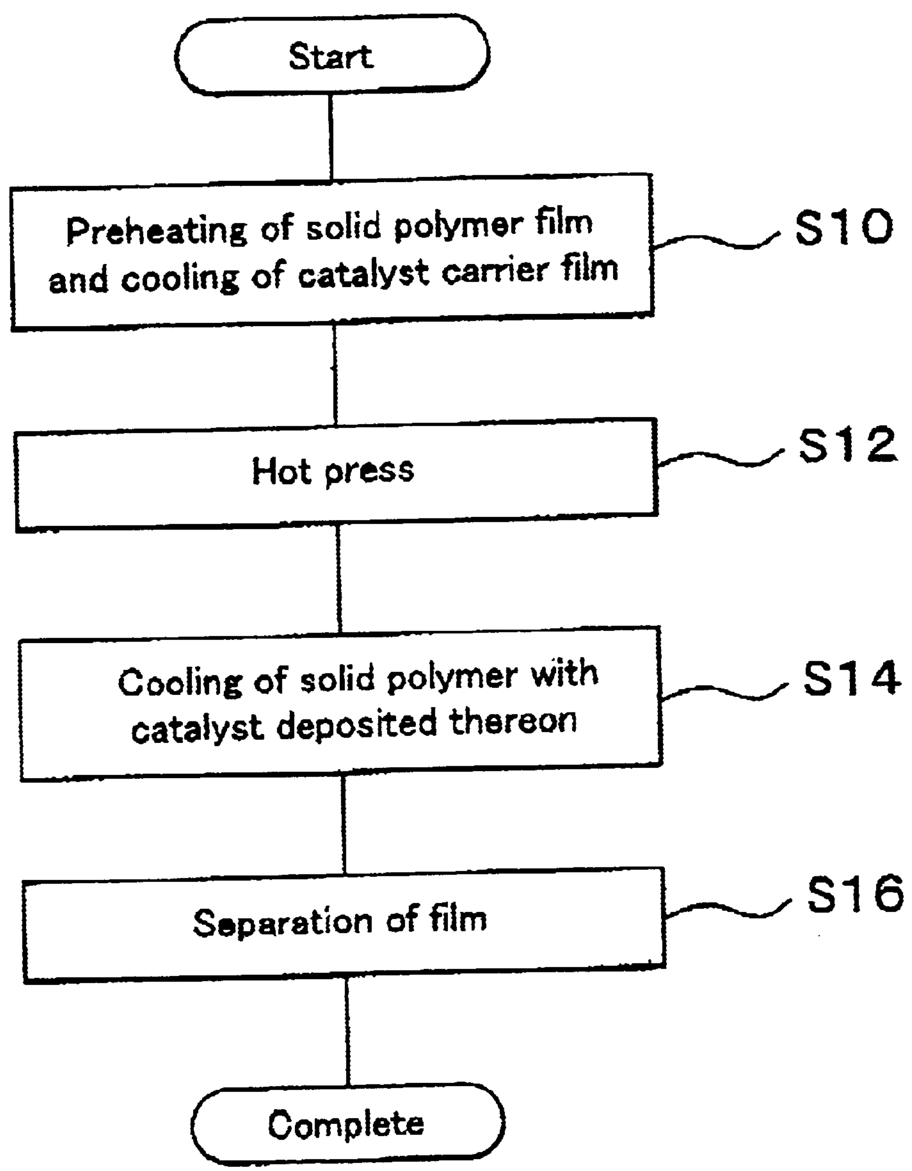
FIG. 2 is an illustration of the manufacturing process of the solid polymer film with a catalyst deposited thereon.

The embodiments of the invention will hereinafter be described with reference to the drawings. FIG. 1 is a schematic drawing of the structure of an apparatus for manufacturing a solid polymer film with a catalyst deposited thereon which is a first embodiment of the invention. The apparatus for manufacturing a solid polymer film with a catalyst deposited thereon 20 is provided with a rollout roller 22 for rolling out a solid polymer film 10, a pair of tension eliminating rollers 24 for eliminating tension of the rolled out solid polymer film 10, and a rollout roller 26 for rolling out a catalyst carrier film 12 carrying a catalyst on one side thereof. The rolled out catalyst carrier film 12 is maintained at a predetermined cool temperature by a cold roller 28, and heated and pressed with the preheated solid polymer film 10 by the pair of heating pressure rollers 30A and 30B so as to become a joined member 14. The joined member 14 is then cooled by a cooling roller 34. A separating roller 36 conforms to the cooling roller 34, rotating therewith, separating the film 16 from the joined member 14. The angle of separation of the film 16 is set by a separation angle setting roller 38, and the film 16 is rolled up with a rollup roller 40. A solid polymer film with a catalyst deposited thereon 18 from which the film 16 has been separated is rolled up with a rollup roller 42.

The solid polymer film 10 is a thin film of a polymer material which exhibits good proton conductivity when wet. For example, a thin film formed of perflourosulfonate ionomers (the DuPont product NAFION) with a thickness of approximately 10 to 300 $\mu$m may be used. Also, the catalyst carrier film 12 is a thin film in which material carrying a catalyst (for example, carbon powder) is applied to one side of a film 16 made of resin. Platinum or an alloy of platinum and another metal may be used as the catalyst.

The tension eliminating roller 24 rotates in sync with the transfer speed of the solid polymer film 10 according to the rotation of the heating pressure rollers 30A and 30B to prevent tension from being exerted on the solid polymer film 10 as it is being heat pressed by the heating pressure rollers 30A and 30B. This enables deformation of the solid polymer film 10 during heat pressing to be controlled.

The cold roller 28 is provided with a cooling device 29 therein for cooling the surface of the cold roller 28, and keeps the solid polymer film 12 within an established cool temperature range (for example, 10 to 40° C.).

The heating pressure rollers 30A and 30B are provided with a heater 31 therein, and a pressure device 32 is provided for exerting pressure between the heating pressure rollers 30A and 30B. The heater 31 heats the surface of the heating pressure rollers 30A and 30B. The heat from the heater 31 is adjusted to become the established temperature set within a range near the glass transition temperature (for example, 80 to 140° C.) of the solid polymer film 10 to be pressed. Also, the pressure to be exerted between the heating pressure rollers 30A and 30B by the pressure device 32 is adjusted so as to be set within the range of 10 to 100 Mpa. Note, the heat from the heater 31 provided in the heating pressure roller 30A is adjusted such that the surface temperature thereof becomes less than or equal to the surface temperature of the heating pressure roller 30B. This way, the cold roller 28 keeps the catalyst carrier film 12 cool and the heating pressure rollers 30A and 30B heat and press while the temperature on the side of the catalyst carrier film 12 is lower than that on the side of the solid polymer film 10. This inhibits an increase in binding strength between the film 16 and the catalyst such that separation of the film 16 from the joined member 14 is able to be improved.

The cooling roller 34 is provided with a cooling device 35 therein for cooling the surface of the cooling roller 34, and cools the joined member 14 to within an established temperature range (for example, 10 to 50° C.).

The separation roller 36 has a diameter of 30 mm or less to improve separation of the film 16. Also, the position of the separation angle setting roller 38 is adjusted such that the angle between the film 16 to be separated by the separation roller 36 and the solid polymer film with a catalyst deposited thereon 18 is substantially 180 degrees.

Next, the manufacturing process of the solid polymer film with a catalyst deposited thereon 18 using the apparatus for manufacturing a solid polymer film with a catalyst deposited thereon 20 will be described with reference to FIG. 2. The manufacturing of the solid polymer film with a catalyst deposited thereon 18 begins first with a process of preheating the solid polymer film 10, in which the tension has been eliminated by the tension elimination roller 24 after being rolled out from the rollout roller 22, by means of the heating pressure roller 30B, while keeping the catalyst carrier film 12, which has been rolled out from the rollout roller 26, cool by means of the cold roller 28 (step S10). Preheating is conducted by transferring the solid polymer film 10 at a predetermined angle with respect to the heating pressure roller 30B. That is, the solid polymer film 10 is preheated by being contacted with the lower roller 30B prior to being pressed by the pair of heat pressure rollers 30A and 30B. Preheating is done because it softens the solid polymer film 10, and hot pressing with the solid polymer film 10 in this soft state increases the binding strength between the solid polymer film 10 and the catalyst.

Next, the preheated solid polymer film 10 and the cold catalyst carrier film 12 is hot pressed with the heating pressure rollers 30 and made into a joined member 14 (step S12). The conditions for the hot press are such that the temperature and pressure are set corresponding to the material of the solid polymer film 10 and the catalyst carrier film 12 (for example, within a temperature range of 80 to 140° C., and within a pressure range of 10 to 100 Mpa).

Then, the joined member 14 is cooled with the cooling roller 34 (step S14) and the film 16 is separated from the joined member 14 with the separation roller 36 (step S16), thereby completing the solid polymer film with a catalyst deposited thereon 18. Note that the completed solid polymer film with a catalyst deposited thereon 18 is rolled up with the rollup roller 42 and the separated film 16 is rolled up with the rollup roller 40.

According to the apparatus for manufacturing a solid polymer film with a catalyst deposited thereon 20 described above, preheating the solid polymer film 10 prior to hot pressing it increases the binding strength between the solid polymer film 10 and the catalyst so as to prevent the catalyst from separating from the solid polymer film 10 during separation of the film 16 from the joined member 14. In addition, keeping the catalyst carrier film 12 cool with the cold roller 28 and making the temperature of roller 30A on the side of the catalyst carrier film 12 lower than that of roller 30B, among the pair of heating pressure rollers 30A and 30B, inhibits an increase in binding strength between the film 16 and the catalyst from the hot press, thereby improving separation of the film 16 from the joined member 14. Also, making the diameter of the separation roller 36 30 mm or less in addition to setting the angle between the film 16 and the solid polymer film with a catalyst deposited thereon 18 to substantially 180 degrees further improves the separation of the film 16. This enables a solid polymer film with a catalyst sufficiently deposited thereon to be manufactured.

Note that in the apparatus for manufacturing a solid polymer film with a catalyst deposited thereon 20 of the foregoing embodiment, the joined member 14 can also be maintained at approximately room temperature until immediately before hot pressing and the cold roller 28 can be omitted.

Also, the temperature of the roller 30B on the side of the catalyst carrier film 12 can also be the same temperature as the roller 30B on the side of the solid polymer film 10. Also, the temperature of the roller 30A may be slightly higher than that of roller 30B.

Further, a cooling device may be provided between the heating pressure rollers 30A and 30B and the cooling roller 34 and the joined member 14 cooled thereby. Also, when there is sufficient space between the heating pressure rollers 30A and 30B and the cooling roller 34, a cooling device for the joined member 14 does not have to be provided.

Also, the diameter of the separation roller 36 may be larger than 30 mm depending on the binding strength between the catalyst and the film 16 and the binding strength between the catalyst and the solid polymer film 10.

Moreover, with the apparatus for manufacturing a solid polymer film with a catalyst deposited thereon 20, the angle between the film 16 to be separated with the separation roller 36 and the solid polymer film with a catalyst deposited thereon 18 is adjusted so as to be substantially 180 degrees, but this angle may be other than 180 degrees.

Furthermore, with the apparatus for manufacturing a solid polymer film with a catalyst deposited thereon 20, the solid polymer film 10 is preheated by being transferred to the heating rollers 30 at a predetermined angle and contacted with these heating pressure rollers 30 prior to hot pressing. However, a preheating device can also be provided separately.

Figure 3:
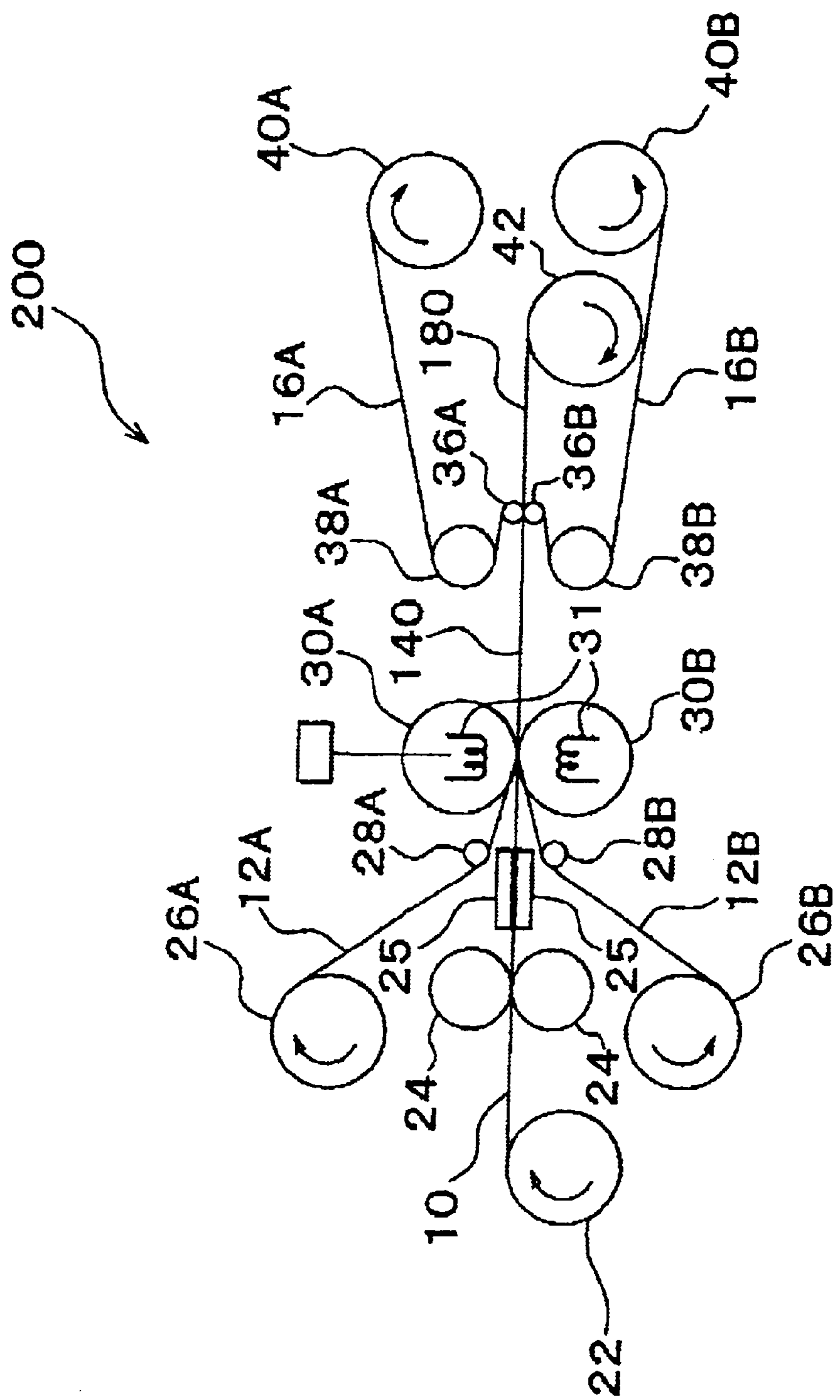
FIG. 3 is a schematic drawing of a construction of an apparatus for manufacturing a solid polymer film with a catalyst deposited thereon of another embodiment.

With the apparatus for manufacturing a solid polymer film with a catalyst deposited thereon 20 of the foregoing embodiment, a solid polymer film with a catalyst deposited thereon 18 in which a catalyst has been joined to one side of the solid polymer film 10 is manufactured. However, a solid polymer film with a catalyst deposited thereon 180 in which a catalyst has been joined to both sides of the solid polymer film 10 can also be manufactured. FIG. 3 shows an apparatus for manufacturing a solid polymer film with a catalyst deposited thereon 200 used in this case. With the apparatus for manufacturing a solid polymer film with a catalyst deposited thereon 200, the solid polymer film 10 is hot pressed by heating pressure rollers 30A and 30B while sandwiched between two sheets of catalyst carrier film 12A and 12B which are rolled out from two rollout rollers 26A and 26B and kept cool by two cold rollers 28A and 28B. Joined by hot pressing, a joined member 140 becomes a solid polymer film with a catalyst deposited thereon 180 in which a catalyst is joined to both sides of the solid polymer film 10 after films 16A and 16B have been separated therefrom with two separating rollers 36A and 36B. Note that the solid polymer film with a catalyst deposited thereon 180 is rolled up with a rollup roller 42B and the two sheets of film 16A and 16B are rolled up with rollup rollers 40A ad 40B, respectively. According to the apparatus for manufacturing a solid polymer film with a catalyst deposited thereon 200 of this embodiment, a solid polymer film with a catalyst deposited thereon 180 in which a catalyst is sufficiently joined to both sides of the solid polymer film 10 is able to be manufactured.

Figure 4:
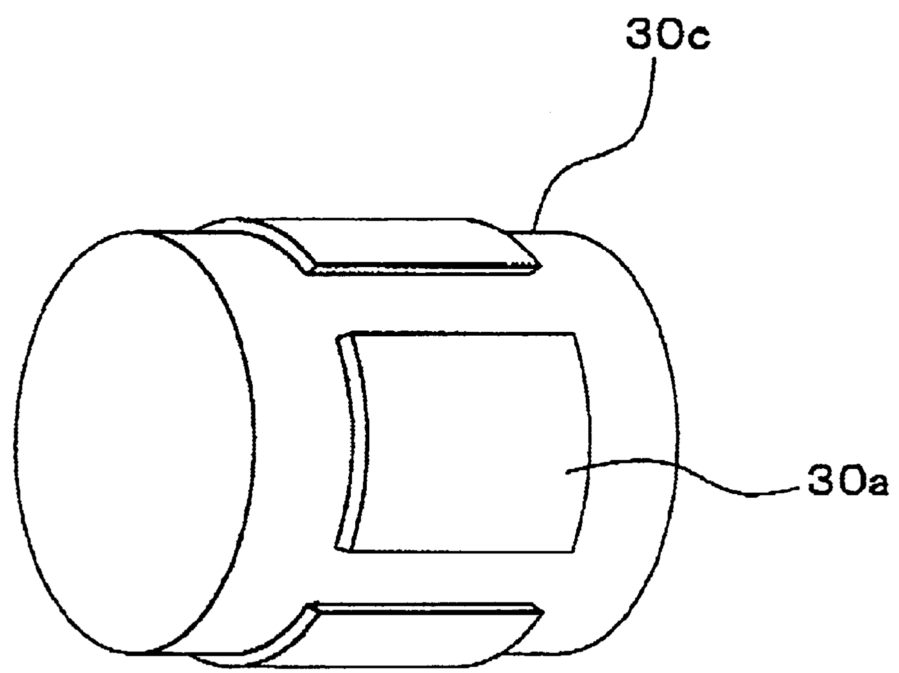
FIG. 4 is an illustration of the appearance of a heating pressure roller of an embodiment.

Moreover, in the apparatus for manufacturing a solid polymer film with a catalyst deposited thereon 20 and the apparatus for manufacturing a solid polymer film with a catalyst deposited thereon 200, the entire catalyst applied to the catalyst carrier films 12, 12A, and 12B is joined with the solid polymer film 10. However, the catalyst can also be joined to the solid polymer film 10 in a predetermined pattern. In this case, as with the heating pressure roller 30*c* shown in FIG. 4, a transfer portion 30*a* protruding from the surface of the roller can be provided. Heat and pressure with respect to the solid polymer film 10 and the catalyst carrier film 12 are applied only to the area of the transfer portion 30*a*. Accordingly, the catalyst carried on the film 16 of the area to which heat and pressure are not applied is separated with the film 16 while the catalyst is joined to the solid polymer film 10 according to the pattern of the transfer portion 30*a*.

The embodiments of the invention have been described above. However, the invention is not limited in any way to these embodiments and may of course be modified without departing from the scope thereof.

What is claimed is:

1. A method for manufacturing a solid polymer and catalyst assembly for a fuel cell, the assembly comprising a solid polymer film and a catalyst deposited thereon, the method comprising:

preheating said solid polymer film;

precooling a catalyst carrier substrate comprising a transfer substrate and a catalyst on one side thereof from a transfer substrate side of the catalyst carrier substrate;

contacting the catalyst with the preheated solid polymer film;

forming a joined member by pressing together and heating the catalyst carrier substrate and the solid polymer film;

separating the transfer substrate from the joined member thereby forming the assembly; and cooling the joined member prior to separating the transfer substrate from the joined member.

2. A method according to claim 1, wherein forming a joined member comprises using opposing pressing surfaces, the pressing surface in contact with the catalyst carrier substrate being maintained at a temperature lower than a temperature of the pressing surface in contact with the solid polymer film.

3. A method according to claim 1, wherein, during separating, the angle between the transfer substrate and the solid polymer film becomes substantially 180 degrees.

4. An apparatus for manufacturing a solid polymer film and catalyst assembly for a fuel cell, the assembly comprising a solid polymer film and a catalyst deposited thereon, the apparatus comprising:

a heater for preheating the solid polymer film thereby yielding a preheated solid polymer film;

a hot press machine for pressing together and heating a catalyst carrier substrate comprising a transfer substrate and a catalyst on one side thereof, and the preheated solid polymer film, while the catalyst and the solid polymer film are in contact thereby forming a joined member;

a cooling machine for cooling the catalyst carrier substrate from its transfer substrate side before the catalyst comes into contact with the pre-heated solid polymer film;

a separating machine for separating the transfer substrate from the joined member thereby forming the assembly; and a cooling machine for cooling the joined member prior to separating the transfer substrate from the joined member.

5. An apparatus according to claim 4, wherein the hot press machine includes opposing pressing surfaces for pressing the joined member therebetween, the pressing surface in contact with the catalyst carrier substrate being maintained at a temperature lower than a temperature of the pressing surface in contact with the solid polymer film.

6. An apparatus according to claim 4, wherein the separating machine is adapted to separate the transfer substrate at an angle of substantially 180 degrees with respect the joined member.

7. An apparatus according to claim 4, wherein the heater and the hot press machine are integrated.

8. An apparatus according to claim 4, wherein the joined member is such that the catalyst is joined to both sides of the solid polymer film.

* * * * *